US011686419B2

(12) United States Patent
Munro (10) Patent No.: US 11,686,419 B2
(45) Date of Patent: Jun. 27, 2023

(54) CONCRETE SANITARY SEWER PIPES AND MANHOLES FEATURING A PROTECTIVE PLASTIC LINER

(71) Applicant: John Munro, Ontario (CA)

(72) Inventor: John Munro, Ontario (CA)

( * ) Notice: Subject to any disclaimer, the term of this patent is extended or adjusted under 35 U.S.C. 154(b) by 234 days.

(21) Appl. No.: 17/103,170

(22) Filed: Nov. 24, 2020

(65) Prior Publication Data

US 2022/0136640 A1 May 5, 2022

(30) Foreign Application Priority Data

Nov. 4, 2020 (CA) .................................. CA 3098058

(51) Int. Cl.
*F16L 58/10* (2006.01)
*B28B 1/16* (2006.01)
*E03F 3/06* (2006.01)

(52) U.S. Cl.
CPC ............ *F16L 58/1036* (2013.01); *B28B 1/16* (2013.01); *E03F 2003/065* (2013.01)

(58) Field of Classification Search
CPC .... F16L 58/1036; B28B 1/16; B28B 19/0023; E03F 2003/065; E02D 29/12; E02D 29/125
See application file for complete search history.

(56) References Cited

U.S. PATENT DOCUMENTS

| | | | | | |
|---|---|---|---|---|---|
| 1,050,137 | A | * | 1/1913 | Horner | E03F 3/06 52/444 |
| 2,816,323 | A | * | 12/1957 | Munger | B28B 21/94 138/146 |
| 4,128,981 | A | * | 12/1978 | Juba | E04H 13/00 52/309.3 |
| 4,621,941 | A | * | 11/1986 | Ditcher | E02D 29/14 404/26 |
| 4,751,799 | A | * | 6/1988 | Ditcher | E02D 29/124 52/21 |
| 5,081,802 | A | * | 1/1992 | Westhoff | E02D 29/149 404/26 |

(Continued)

FOREIGN PATENT DOCUMENTS

DE 2855201 A1 7/1980
EP 3154757 B1 10/2019

OTHER PUBLICATIONS

Buecker; Machine Translation DE 2855201; Jul. 1980 (Year: 1980).*
EESR From Patent Application No. 21206357.2-1002 dated Mar. 25, 2022.

*Primary Examiner* — Benjamin F Fiorello
(74) *Attorney, Agent, or Firm* — Lippes Mathias LLP (57) ABSTRACT

A prefabricated composite concrete element for use in a corrosive sewer environment. The concrete element has a hollow reinforced cast concrete portion with at least one end having connection details, a premolded corrosion resistant inner plastic liner. The plastic liner lines an interior of the hollow concrete element and the connection details to provide abutting liner faces in an assembled joint to limit exposure through said joint of said concrete portion to corrosive materials arising in said sewer environment. At least two prefabricated composite concrete elements may be assembled end to end at a joint to form a concrete sewer system. Also disclosed are a method of prefabricating such a composite concrete element.

20 Claims, 8 Drawing Sheets

(56) References Cited

U.S. PATENT DOCUMENTS

| | | | | |
|---|---|---|---|---|
| 5,168,682 | A | * | 12/1992 | Rye .................... F16L 58/1018 52/247 |
| 5,303,518 | A | * | 4/1994 | Strickland ........... B28B 19/0046 52/249 |
| 5,383,311 | A | | 1/1995 | Strickland |
| 5,901,506 | A | * | 5/1999 | Zicaro ................... E02D 29/124 52/245 |
| 7,955,026 | B2 | * | 6/2011 | Kamiyama ............. E02D 29/12 405/133 |
| 8,968,623 | B2 | * | 3/2015 | Manthei ................ B28B 13/062 264/297.9 |
| 9,617,722 | B2 | * | 4/2017 | Skinner ................... E03F 5/027 |
| 2002/0109068 | A1 | * | 8/2002 | Staskiewicz .............. B28B 7/44 249/105 |
| 2017/0106562 | A1 | * | 4/2017 | Müller .................. F16L 58/185 |

* cited by examiner

CONCRETE SANITARY SEWER PIPES AND MANHOLES FEATURING A PROTECTIVE PLASTIC LINER

This application claims priority to Canadian Patent Application No. 3,098,058, filed with the Canadian Patent Office on Nov. 4, 2020 and titled "CONCRETE SANITARY SEWER PIPES AND MANHOLES FEATURING A PROTECTIVE PLASTIC LINER," the entire contents of which are incorporated herein by reference.

FIELD OF THE INVENTION

The present invention relates generally to the field of wastewater or sewer systems, and components used in such systems. More particularly, the present invention relates to methods and apparatuses to make corrosion resistant elements for such systems, and sewer systems made from such components that resist chemical degradation in an acidic wastewater environment.

BACKGROUND OF THE INVENTION

Concrete pipes, manholes, risers and other elements have long been used in underground fluid transportation systems used to transport raw sewage and other types of wastewater from a source, such as a human habitation to a central sewage treatment plant. Concrete is well suited for this application as it can be formed into durable reinforced shapes which can be installed underground, and which are intended to last for many decades. Some of the typical concrete elements used in a sewer system are concrete pipes, joined end to end, for example in a bell and spigot arrangement and manholes, which may be used to provide access to the concrete pipes at various locations. The manholes may be formed from a number of elements including a base and risers to extend the manhole to a cap located at the surface of the ground. Catch basins may also be used and incorporated onto a sewer system to allow wastewater inflow from pipes at different elevations to be combined to a common height outflow pipe.

However, a problem has arisen with the use of concrete sewer systems and concrete elements. It has been known for some time now that the H2S gas may be present or generated in wastewater as the waste is being transported through the sewer system. Such gas can combine with water inside the hollow concrete elements to form sulfuric acid, a strongly corrosive acid. The sulfuric acid in turn can come into contact with the interior wall of the hollow concrete pipes and other elements of the system and can then react with calcium carbonate, present in the concrete walls of the various elements, to form calcium sulfate and carbon dioxide. Calcium sulfate is a soft material which is susceptible to crumbling and is easily washed away.

The action of the sulfuric acid on the concrete is a form of corrosion and can cause a reduction in the wall thickness and a weakening of the concrete wall. This is problematic, because sewer pipes and manholes were believed to have a service life expectancy of 50 to 70 years, or more, but experience has shown that the sulfuric acid generated within these sewer pipes and manholes can reduce that time significantly, in some cases to a mere 15 to 20 years. The corrosion effect is exacerbated in hot weather climates, where the waste can start decomposing in the sewer systems before it even reaches the sewage treatment plants can produce more abundant amounts of H2S than in colder conditions. To prevent premature degradation of expensive infrastructure comprising such concrete based sewer systems, corrosion resistant sewer pipes, manholes and other elements are highly desirable.

Because the corrosion problem can start from a gas, it is understood that no interior concrete surfaces should be exposed to the gas, failing which corrosion may begin at such exposed surfaces. This has led to many solutions involving lining the sewer system, after it is built, in a way that covers interior concrete surfaces within such systems.

The installation of a liner in the field after the system is built is very challenging, expensive and not totally reliable. Trying to form a chemical resistant liner within existing sewer systems that are already in place, with corners, long narrow runs and intermittent manholes and complex configurations has not proved very successful to date, at least in part due to the expense of field installing such a liner.

Polymer concrete is a known building material. It is comprised of a polymer mixed with aggregate such that the polymer replaces the cement and water components of a typical structural concrete mix. Polymer concrete has several desirable properties, including a high tensile strength and a high degree of chemical resistance. A main disadvantage though is that it is very expensive on a per unit basis relative to conventional concrete. Therefore, casting concrete sewer components entirely from polymer concrete as a solution to providing resistance to chemical degradation of the concrete is too expensive. Suggestions to cast the concrete elements partly from conventional structural concrete and partly from polymer concrete reduces the amount and thus the cost of the polymer component but requires two casting steps and so is again very expensive. Some of the various prior art solutions to the corrosion problem within concrete sewer systems are discussed below.

U.S. Pat. No. 4,608,280 teaches a concrete polymer composition that can be used as a liner or coating for pipes, as well as methods of lining pipes and a reusable mold for preparing filled girthweld concrete cutbacks. The reusable mold comprises a separate sheath having a means to introduce a filler composition into the girthweld concrete cutback, where the sheath is capable of conforming to the shape of the coated pipe and circumscribing the interior perimeter thereof. While possibly providing a chemical resistant lining, this is very difficult to achieve in the field and requires a great deal of time, labour expertise and expense to try to line the interior of an existing complex sewer system.

United States Patent Application Publication No. 2018-0149300 teaches that field installed polymeric liners in field installed concrete pipes can have problems, in part due to the strength and curing differences between the liner and the outer concrete shell. This patent application proposed that these issues can be resolved by introducing a foam layer between the polymeric liner layer and the concrete shell. However, this problem is discussed in the context of SIPP (sprayed in place pipe) and CIPP (cast in place pipe). Both of these include concrete elements which are formed and lined in the field which can be a difficult and expensive technique, due to the lack of control over the casting conditions, as well as restrictions on space and access, as well as the inherent complexity of the interior surfaces to be lined.

U.S. Pat. No. 4,375,489 teaches using a polymer concrete as a lining for pipe, including concrete pipes. However, the polymer concrete is expensive as noted above and this requires two casting and curing steps, one for the pipe and one for the liner. While less expensive than casting the full concrete element out of polymer concrete it is still a complex and expensive solution. There is also no teaching in this patent with respect to protecting the joints between abutting pipe sections.

U.S. Pat. No. 6,048,593 teaches a formulation for an improved polymer concrete which has superior chemical resistance strength and other properties. However, it does not teach or suggest casting the improved polymer material as a liner for a conventional concrete part such as a pipe or a manhole. As noted above, polymer concrete on its own is not a cost-effective solution to the problem of concrete corrosion in acidic sewer system environments.

U.S. Pat. No. 5,599,857 relates to a waterless polymer composition that can be used as a liner for pipes. The material is applied to the inside of the pipe by spinning the pipe until a consistent layer forms and then allowing the composition to cure. This is relevant in that it is directed to a polymer pipe lining that is resistant to certain chemicals. While interesting, the teachings of this patent are quite limited, in that it requires a machine large enough to be able to spin large concrete pipes. It is not clear how other shaped elements (such as rectangular elements) can be lined, if at all. Further, it is not clear how a spun liner can protect the joints between abutting pipe sections from gas infiltration. A simpler more universal way of creating a variety of shapes of corrosion resistant concrete elements is preferred.

U.S. Pat. No. 3,340,115 is directed to forming a protective layer over a concrete pipe by means of adding a polymer layer onto the outside of the pipe. It teaches that the resulting pipe will have substantial resistance to impact and dynamic loading and be substantially impervious to the infiltration of chemicals through the pipe. Essentially the pores of the porous pipe body are filled with a tough rubbery resin composition which is applied in an excess amount to permit the layover of glass resin, wherein when the rubbery compound is cured it forms a reinforced concrete pipe. However, since this coating is applied to the outside it cannot offer any protection to the interior concrete wall of the pipe to acidic components arising within the wastewater being transported through the inside of the concrete pipe.

Other examples of concrete pipe and manholes systems include: U.S. Pat. Nos. 5,032,197, 5,271,193, 5,386,669, and 9,617,722, and 10,458,093; Chinese Pat. Ref. No. 103925456; and UK Pat. No. 2,123,918.

Accordingly, there is a need for a better solution to the concrete corrosion problem than the ones noted above.

SUMMARY OF THE INVENTION

What is desired is a concrete element that can be shaped into any desired element shape and which is protected by a corrosion protection layer. Preferably the concrete element can be preformed in one casting step. The concrete element may therefore be less expensive to make than an element formed with a polymer concrete formulation and will preferably be largely comprised from conventional low slump high strength structural concrete. Preferably, such a concrete element can be formed under conditions which can be controlled to facilitate reliable concrete pouring, setting and curing results. Such a concrete element may preferably be mass produced in a prefabrication facility, and may preferably be designed in a way that enables a sewer system to be field assembled into a corrosion or degradation resistant sewer system, with a minimum of field labour and expense or complexity.

Therefore, according to one aspect of the invention, there is provided a prefabricated composite concrete element for use in a corrosive sewer environment, said concrete element comprising:
  a hollow reinforced cast concrete portion with at least one end having connection details; and
  a premolded corrosion resistant inner plastic liner;
  wherein said plastic liner lines an interior of said hollow concrete element and said connection details to provide abutting liner faces in an assembled joint to limit exposure through said joint of said concrete portion to corrosive materials arising in said sewer environment.

According to another aspect the present invention, there is provided a concrete sewer system comprising at least two prefabricated composite concrete elements assembled end to end at a joint, each of said at least two prefabricated composite concrete elements comprising:
  an outer reinforced cast concrete portion;
  a connection detail at one or both ends of said composite concrete element; and
  a continuous inner plastic liner defining a corrosion resistant throughbore for transporting wastewater;
  wherein each said continuous plastic liner lines an interior of said outer reinforced cast concrete portion and conforms to said connection details to permit said at least two assembled prefabricated composite concrete elements to form a liner to liner contact face in said joint; and
  wherein said liner to liner contact face permits said joint to be sealed to contain corrosive elements within said throughbore.

According to yet another aspect of the present invention, there is provided a method of prefabricating a cured composite concrete element for a wastewater system, said method comprising the steps of:
  positioning an outer mold element to define an outer concrete surface of said composite concrete element;
  positioning a preformed inner plastic liner to define an interior surface of said composite concrete element, said preformed inner plastic liner at least partially further defining end connection details of said composite concrete element, and creating a casting void between said outer mold element and said preformed inner plastic liner;
  providing at least one inner mold element to support said preformed inner plastic liner in position during concrete casting;
  filling said casting void with concrete and allowing said concrete to set to form a cast composite concrete element;
  removing said at least one inner mold element, and then removing said cast composite concrete element from said outer mold element; and
  curing said cast composite concrete element to form said cured composite concrete element.

BRIEF DESCRIPTION OF THE DRAWINGS

Reference will now be made to preferred embodiments of the invention with reference, by way of example only, to the following drawings, in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
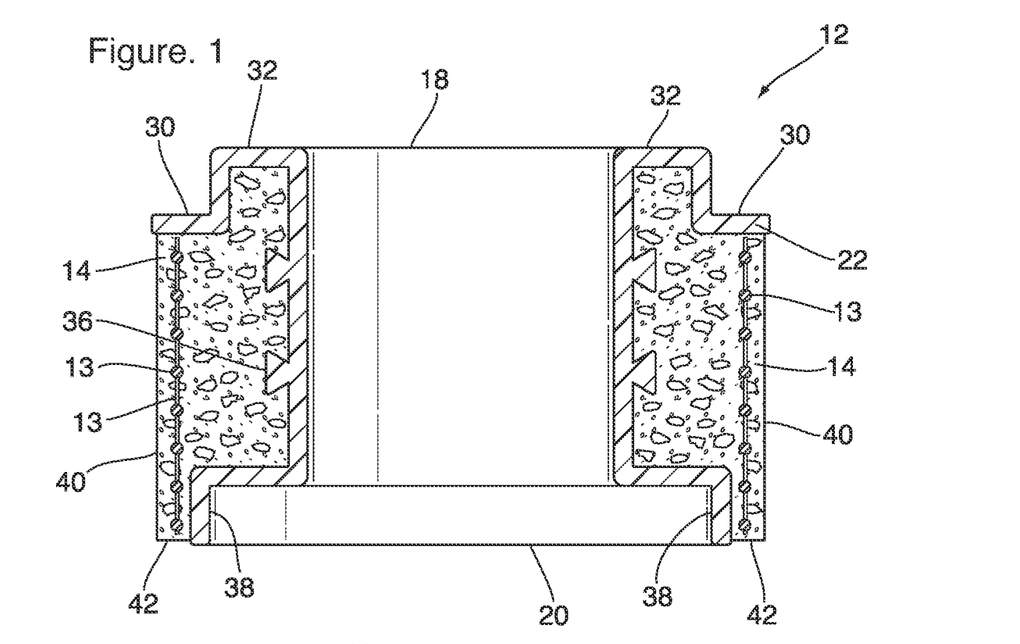
FIG. 1 is a cross-sectional view of a composite concrete element according to an embodiment of the present invention, showing connection details at both ends.

A corrosion resistant, composite concrete element 12 according to an embodiment of the present invention, is shown in FIG. 1. Most preferably the composite concrete element 12 is precast in a controlled factory environment. The composite concrete element 12 may be dimensioned to be a pipe, or a manhole product, such as a manhole base or riser. In general, the configuration of the connection elements formed into one or both ends of the composite concrete element 12 will be similar, with the length of the body varying according to whether it is a long pipe or a short riser for example. In this specification, the term connection details refers to the configuration of the attachment ends of each composite concrete element 12, which configuration includes complementary shapes to allow one composite concrete element 12 to be assembled to the next composite concrete element 12 in an interlocking, or nesting manner. In some cases, the connection details may take the form of a bell and spigot configuration. Further, it will be understood that the present invention comprehends that the composite concrete element 12 can be any shape, and have any suitable dimensions. Although most commonly the composite concrete element 12 will be circular in cross-section, it can also be precast into a rectangular or square cross-sectional configuration of any predetermined cross-sectional area to suit the desired end application. Such a flexibility in shape and design according to the present invention arises from the preferred manufacturing method as described in more detail below.

The composite concrete element 12 includes a hollow reinforced concrete portion 14, which constitutes the bulk of the composite concrete element 12, and a liner portion 16. The concrete portion 14 is preferably formed from a concrete which is best suited for use in a wastewater or sewer system. Most preferably low slump high strength concrete is used which may include certain additives to enhance the strength or workability of the concrete such as water reducing agents, air entrainment and super plasticizers. The concrete is preferably cast in a mold and around reinforcing bars 13, which may be formed into a cage, for providing tensile strength to the composite concrete element 12 in a known manner. The size, amount, shape and location of the reinforcing bars 13 will vary depending upon the size, shape and intended application of the composite concrete element 12, as will be understood by those skilled in the art. As shown, the concrete portion 14 has a top end 18 and a bottom end 20. The connection details include a top notch 22 formed at the top end 18 facing an outside face 24 of the composite concrete element 12, and a bottom notch 26 formed at the bottom end 20 facing an inside face 29 of the concrete portion 14.

The liner portion 16 is preferably formed in advance from plastic, such as high-density polyethylene (HDPE) in a separate molding step. A preferred plastic is one which is substantially chemically resistant to the sewer gases and typical acidic by-products thereof. Therefore, while HDPE is preferred, the present invention comprehends that other forms of thermoplastics may also be used, provided they provide sufficient resistance to chemical degradation of the type arising from wastewater systems. By way of example, the liner portion 16 may be molded in a roto molding machine which spins a mold to distribute the plastic being formed into a uniform thickness about the periphery of the mold. Once forced by centrifugal forces into the desired shape through spinning, the plastic is allowed to cool and harden in the desired shape before being removed from the mold. HDPE is also preferred due to its inherent strength, but the liner is not a load bearing element as described below and so its thickness can vary. Generally, a liner portion 16 of between ¼ inch and ¾ inch in thickness is preferred. Other thicknesses are also comprehended by the present invention provided that the liner portion 16 is reasonably durable on the one hand and yet economical in terms of the amount of plastic used on the other hand. In some cases, a multi-part mold may be required to allow the liner portion 16 to be removed from the roto mold once hardened. Other methods of molding are also comprehended by the present invention, such a thermal injection molding and the like, but for large tubular liners, roto-molding is preferred.

The prefabricated corrosion resistant plastic liner portion 16 includes a first top step 30 to cover the top notch 22 of the concrete portion 14, and a top face 32. Together to the top step 30 and the top face 32 of the liner portion 16 cover the top end of the concrete portion 14. The liner portion 16 also includes a side wall 34 which fully covers the inside face 29 of the concrete portion 14. Engagement anchors 36 may be molded into the outside face 24 of the liner portion 16 extending from the side wall 34, into the inside face 29 of the concrete portion 14 as shown. Although shown as part triangular in cross-section, the size, shape and positioning of the engagement anchors 36 can be varied without departing from the scope of the present invention. All that is desired is to improve the cast connection between the liner portion 16 and the concrete portion 14. Further, in some cases the engagement anchors 36 may not be required, depending on the size and shape of the concrete portion 14 and the matching liner portion 16.

The liner portion 16 also includes a second lower step 38 to cover the bottom notch 26 of the concrete portion 14. Most preferably the liner portion 16 including the first top step 30, side wall 34, and the second lower step 38 is formed as a single continuous part, to cover and thereby protect the concrete portion 14 underneath from corrosive gasses and liquids arising within the wastewater. Although the liner portion 16 is preferably molded as an integral part, the present invention comprehends molding the liner portion 16 in one or more parts, which can be assembled together into the desired configuration, providing however that the assembled parts are joined in such a way as to protect the underlying concrete portion 14 from coming into contact with the corrosive sewer gasses, liquids or other materials within the wastewater flowing through the composite concrete element 12.

As shown in FIG. 1 the liner portion 16 covers all surfaces of the concrete portion 14, except for an outer face 40 and an open bottom face 42 adjacent to the bottom notch 26. The advantage of this open bottom face 42 will be explained below. In particular the present invention comprehends that the liner portion 16 extends over the top and bottom notches 22,26 of the concrete portion 14, forming the connection details so as to provide corrosion resistance through a joint formed between two composite concrete elements 12 assembled together.

Figure 2:
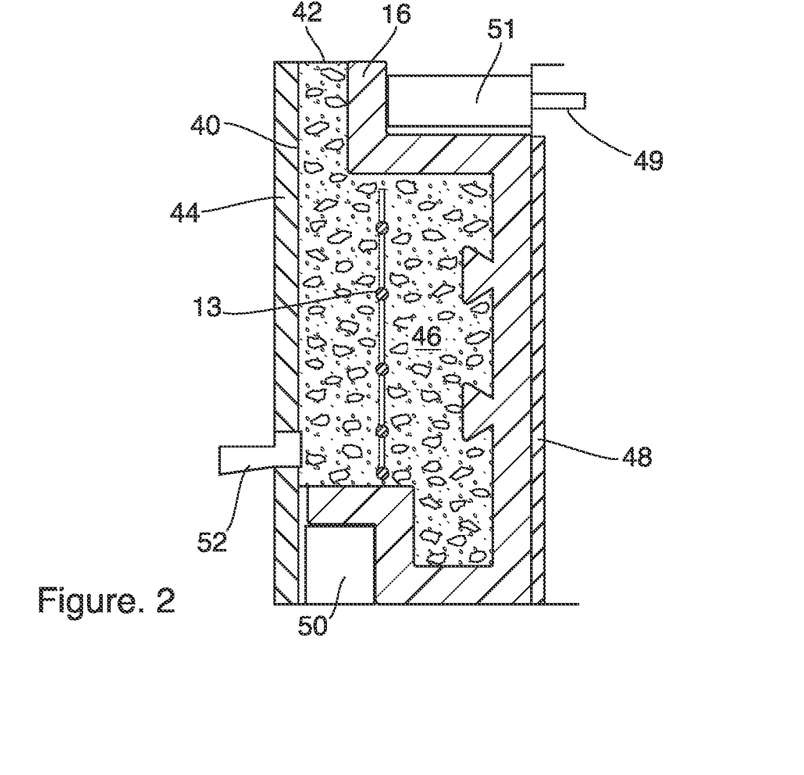
FIG. 2 is a cross-sectional view of the composite concrete element of FIG. 1 in a casting position according to an embodiment of the present invention.

Referring now to FIG. 2, there is shown the composite concrete element 12 of FIG. 1 in a molding position. In the molding position, the composite concrete element 12 is molded in an upside-down position relative to the position it is placed or used in the field (or more particularly as shown in FIG. 1). Prior to molding, the reinforcing bars 13 are positioned in a desired location within a mold space 46. The outer face 40 of the concrete portion 14 is defined by an outside mold jacket 44, which may be made from steel or the like. The liner portion 16 is then placed inside of the outside mold jacket 44 to complete the mold space 46, which contains the reinforcing bars 13, if any. In most cases the liner portion 16 is then supported on the inside by an inner steel mold core 48. Mold blocks 50, 51 are placed behind the liner portion 16 to support the liner portion 16 located at the connection details against deflection under the influence of the concrete as it fills the mold space 46. Alternatively, one or more hydraulic cylinders 49 in the inner steel mold core 48 may be used to support the liner portion 16 to form, for example, the bottom notch 26 (which in the molding step appears at the top of the drawing as noted above). It can now be understood that the liner portion 16 is fully supported in the mold against deflection during concrete casting.

In one embodiment, one or more concrete pump ports 52 are formed in the outside mold jacket 44 to allow the concrete to be pumped in to the mold space 46 around the reinforcing bars 13 and between the liner portion 16 and the outside mold jacket 44. It can now be appreciated that the open bottom face 42 of FIG. 1 is now a "top face" in FIG. 2. This open bottom face 42 allows for the mold to be filled to a predetermined amount and provides one or both of a way to introduce further concrete into the mold space 46 and a visual check to ensure that the mold space 46 is full of concrete to encourage void free molding of the concrete element 12. A shaker table or other vibration devices may be used to ensure that the concrete is evenly and completely disbursed within the mold space 46 and around the reinforcing bars 13. Once the cast concrete has set sufficiently in the mold, the molding elements (i.e. the inner steel mold core 48, the outside mold jacket 44, and mold blocks 50,51, if used) can be stripped and the composite concrete element 12 can be sent to a steam curing room for final curing, for example.

Figure 3:
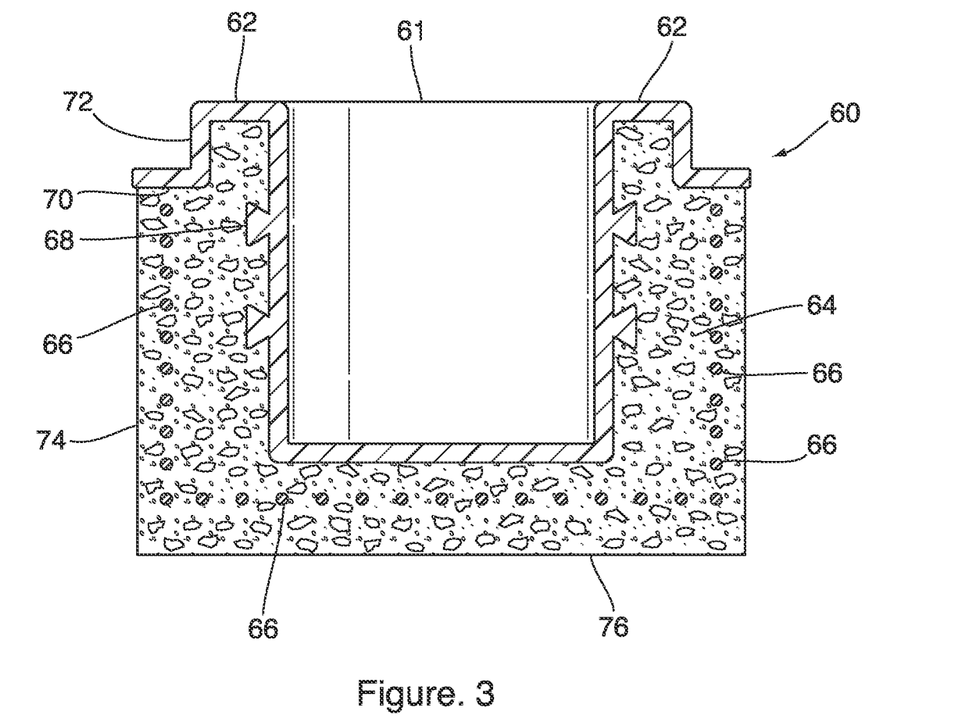
FIG. 3 is a cross-sectional view of another embodiment of the present invention, showing connection details at one end.

FIG. 3 shows a second embodiment of a composite concrete element 60 according to the present invention. In this embodiment, rather than having connection details at both ends of the composite concrete element 60, connection details are only provided at a top end 61. As can now be understood the composite concrete element 60 is a base element for a manhole, catch basin or the like. It includes a liner portion 62 and a concrete portion 64. Reinforcing steel bars are shown at 66. The liner portion 62 may include engagement anchors 68. An outer notch 70 is formed in the concrete portion 64 to make a connection detail and the liner portion 62 includes a step 72 which covers the top connection detail or outer notch 70. The outer side face 74 and the bottom face 76 of the concrete portion 64 are left uncovered, namely are not covered by the liner portion 62, as they are on the outside will not be exposed to the potentially corrosive wastewater contained within the composite concrete element 60. The composite concrete element 60 may also be molded upside down in a manner similar to that described above for composite concrete element 12.

Figure 4:
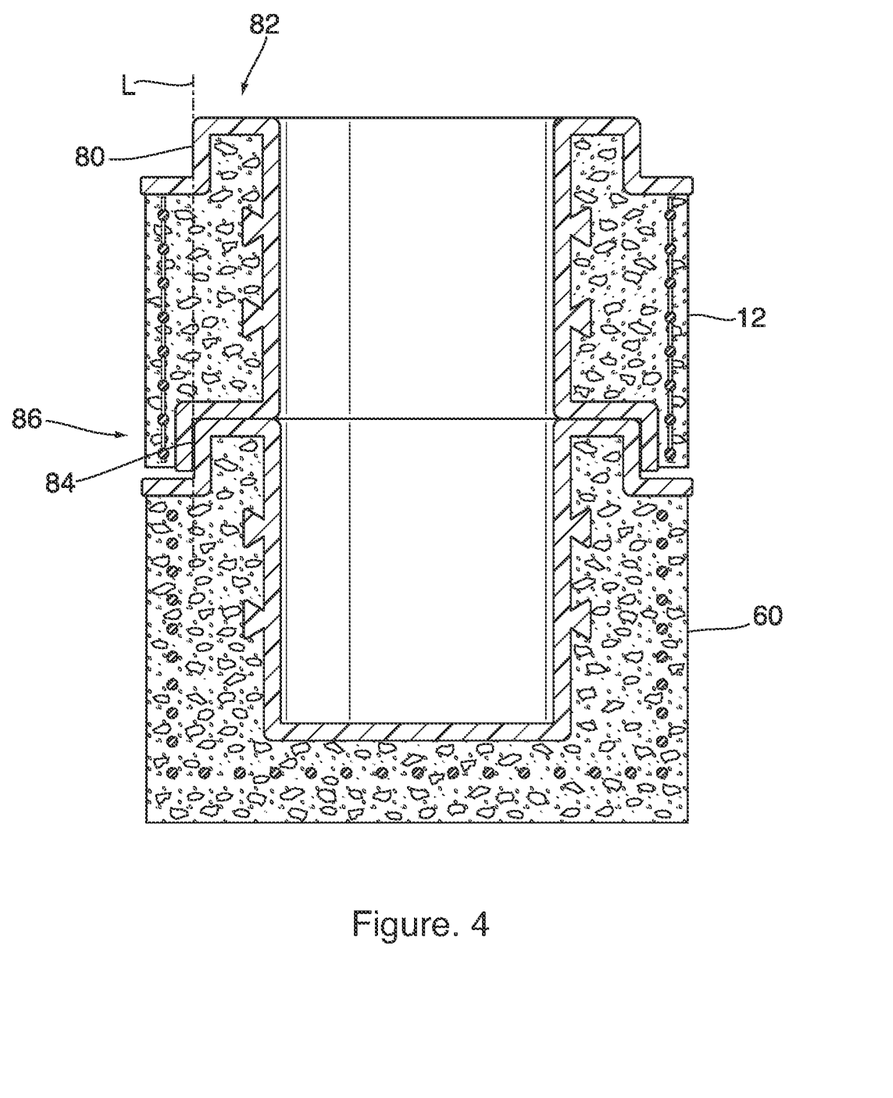
FIG. 4 is a cross-sectional view of the composite concrete element of FIG. 1 assembled together with the composite concrete element of FIG. 3.

It will be noted that the top connection detail of composite concrete element 60 is substantially identical to the top connection detail of composite concrete element 12. This is to provide a uniform connection detail that permits different composite concrete elements 12, 60 to be easily assembled together in the field. FIG. 4 shows the composite concrete element 12 of FIG. 1 assembled together with the composite concrete element 60 of FIG. 3. A reference line L has been added for clarity. It is preferred that the composite concrete elements 12, 60 are easily connectable to one another, to facilitate their assembly together in the field. As shown, this can be facilitated by making the face 80 at the top connection detail 82 inside of the reference line L, while making the face 84 at the bottom connection detail 86 outside of the reference line L. How close the faces 80 and 84 are to the reference line L will determine what gap tolerance is present in the joints between the assembled composite concrete elements 12, 60. In some cases it may be preferred to mold the faces 80 and 84 with a small draft, or taper with a narrower diameter at the top and a larger diameter at the bottom to facilitate a tight fit between adjacent composite concrete elements 12, 60. What is desired is to have a tight fit but one which is easy to assemble under field conditions.

Figure 5:
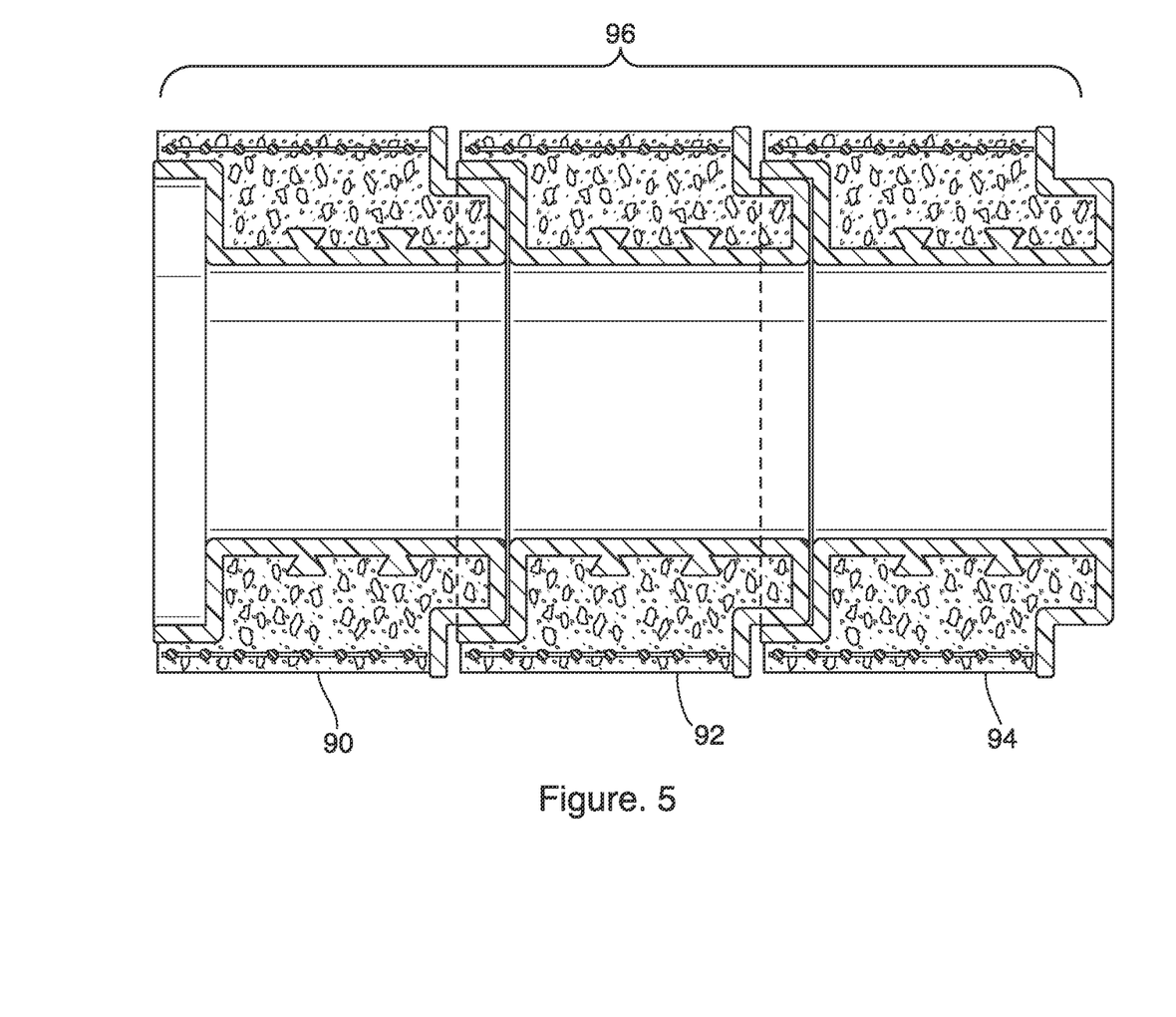
FIG. 5 is a cross-sectional view of three of the composite concrete elements of FIG. 1 assembled together in a field installation position.

FIG. 5 shows a plurality of composite concrete elements 90, 92, and 94 connected together in a horizontal assembly 96. It can now be appreciated how using the preferred liner portion and connection details described above provides for a continuously lined assembly with a complete corrosion resistant liner, namely one which extends into the joints between adjacent composite concrete elements. According to the present invention the joints are sealed against infiltration of corrosive elements thus preventing any exposed concrete from coming into contact with such corrosive elements.

Figure 6:
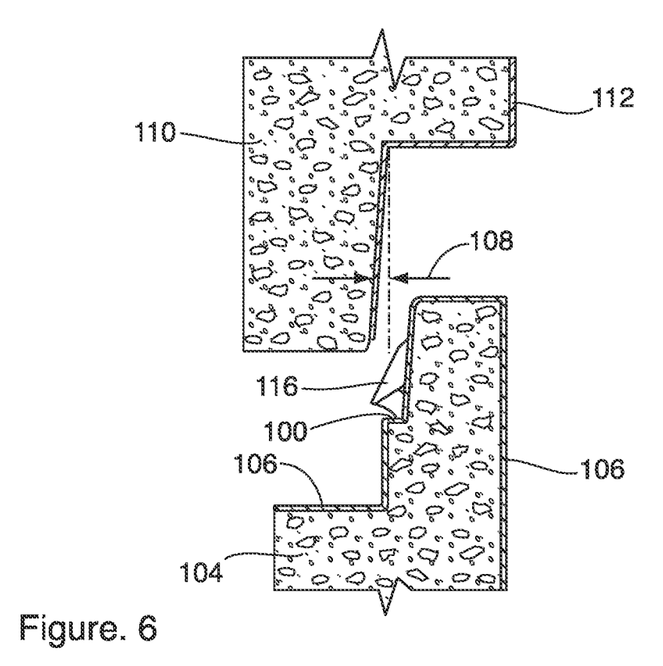
FIG. 6 is a cross-sectional view of yet another embodiment of the present invention showing self-lubricating gasket in a joint between two composite concrete elements about to be assembled together.
Figure 7:
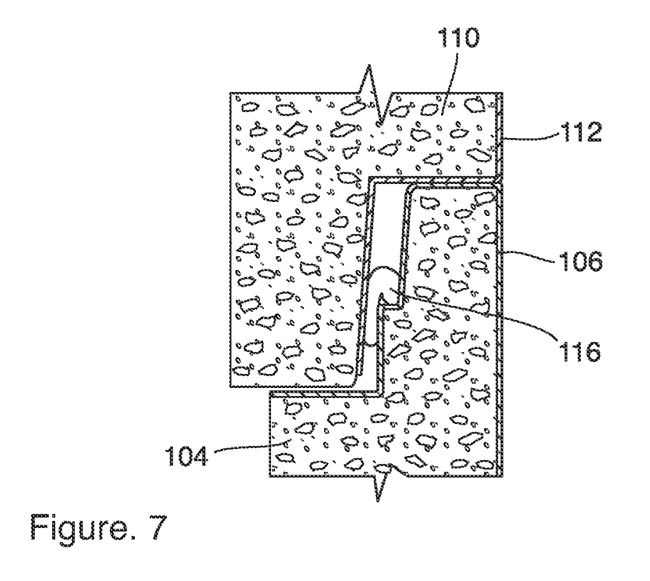
FIG. 7 is a cross-sectional view showing the joint of FIG. 6 after the two composite concrete elements are assembled together.

FIG. 6 shows a further embodiment of a joint according to the present invention. In this case a small shoulder 100 is formed in the outer face 102 of the lower composite concrete element 104 and in the liner portion 106 covering the outer face 102. A draft, or taper 108 is more clearly shown in the upper composite concrete element 110 which has a liner portion 112. A complimentary draft, or taper may also be present in the outer face 102. A gasket 116, such as a self-lubricating gasket, can be placed abutting, or resting on the shoulder 100. FIG. 7 shows the joint formed when the abutting composite concrete elements 104 and 110 are assembled together. As shown, the gasket 116 is located between the lined and abutting faces of the two concrete portions to prevent corrosive materials from being able to leak between the abutting liner portions 106 and 112 and out of the joint formed therebetween.

Figure 8:
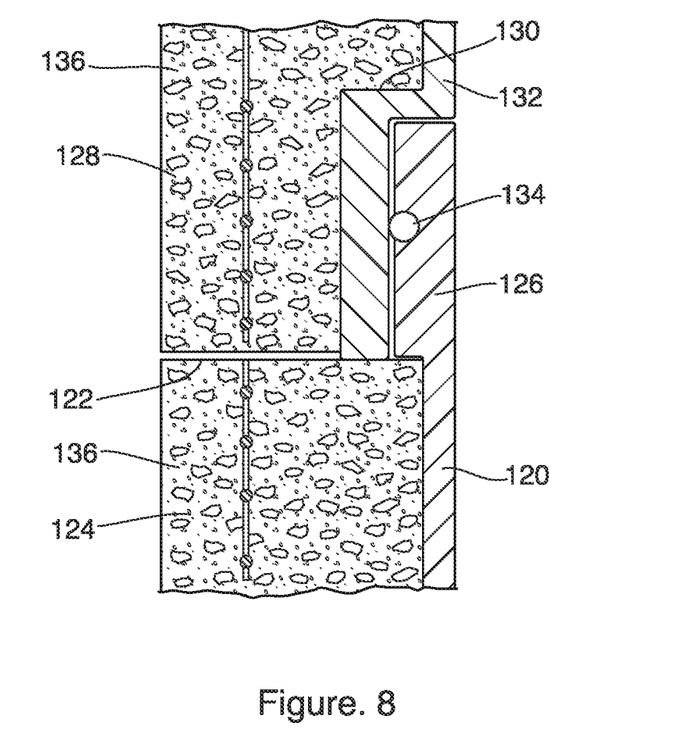
FIG. 8 is a cross-sectional view of a joint between two composite concrete elements according to yet another embodiment of the present invention.

FIG. 8 shows an alternative embodiment of a liner portion 120. In this case the liner portion 120 extends above the top edge 122 of the lower composite concrete element 124 as a liner extension portion 126. The lower connection detail of the top composite concrete element 128 includes a notch 130 in the concrete portion 136 which is lined by a liner portion 132. The liner extension portion 126 of the lower liner portion 120 is sized and shaped to fit into the lined notch 130. A gasket 134 may be provided between the liner portions 120 and 132 to prevent leakage of corrosive materials through the joint. While similar in concept to the previous embodiments, in that the liner portions overlap and conform to the connection details to prevent the corrosive materials from penetrating through the joint, this embodiment is more fragile in that the liner extension portion 126 of the liner portion 120 projects outwardly as a lip, and so must be protected from harm during shipping, handling and assembly of the composite concrete element 124.

Figure 9:
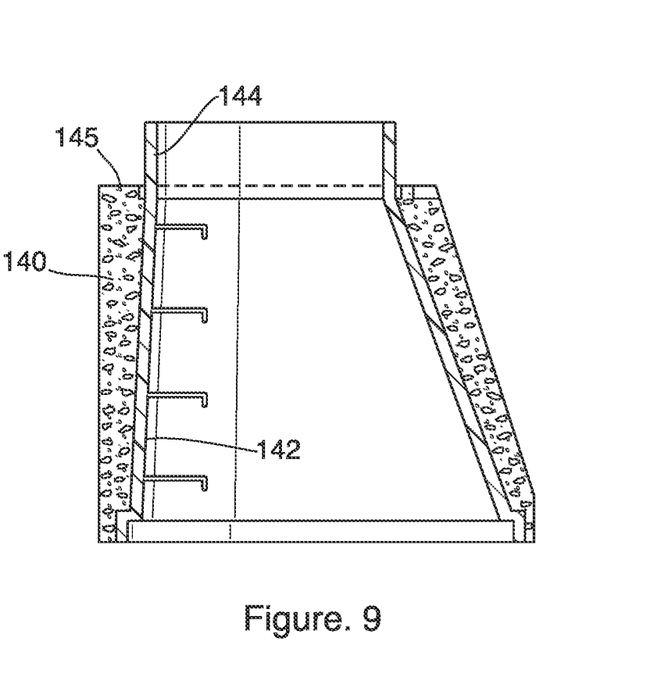
FIG. 9 is a cross-sectional view of a composite concrete element with a tapered top according to yet another embodiment of the present invention.
Figure 10:
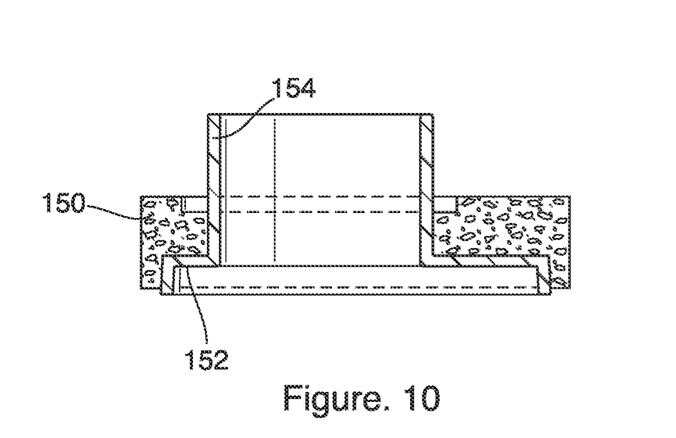
FIG. 10 is a cross-sectional view of a flat cap for use with the composite concrete element with tapered top of FIG. 9, according to yet another embodiment of the present invention.

FIG. 9 is a cross-sectional view of a tapered part of a manhole 140 according to the present invention, including a liner portion 142 as described above in respect of FIG. 7. As shown the liner portion 142 includes an extension 144 above the top 145 of the manhole 140. FIG. 10 is a cross-sectional view of a top 150 for a manhole which includes a liner portion 152. A liner extension portion 154 may preferably be provided as shown to extend the liner portion 152 above the top 150. When assembled the top 150 sits on the manhole 140 and the liner extension portions 144 and 154 overlap and are in an abutting relationship.

Figure 11:
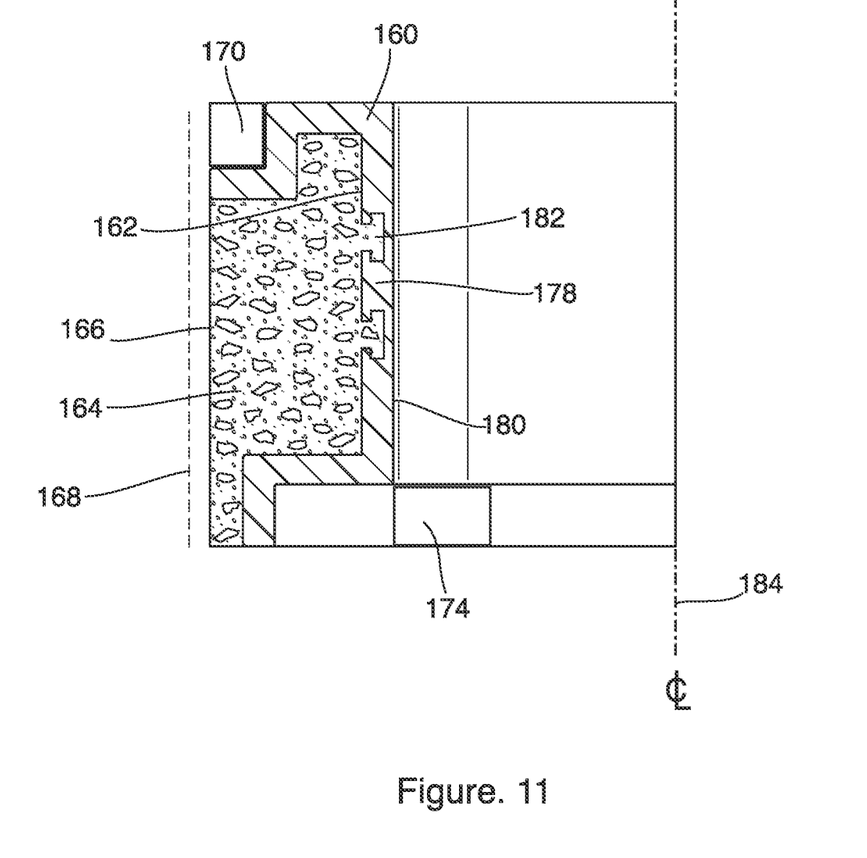
FIG. 11 is a cross-sectional view of a second anchor configuration between the cast concrete and the liner according to a further embodiment of the present invention.

FIG. 11 shows a further anchor configuration according to the present invention. In this embodiment the liner 160 is shown on an inside face 162 of a cast concrete part 164. An outer face 166 of the concrete part 164 is defined by a mold element 168. A block 170 supports an upper step 172 and a lower block 174 supports a lower step 176. In this drawing the lower block 174 is shown withdrawn from the step 176. It will be understood that this part 164 is preferable molded or cast in an orientation upside down from that shown in this figure.

Anchor elements 178 are formed on a concrete contacting face 180 of the liner 160. In this embodiment there are provided t-shaped openings 182 into which the wet concrete flows, in a mirror image of the anchors of the prior embodiment. Although the anchor elements 178 can vary what can be now understood is that the present invention provides for a form of anchor element formed on an outside face of the liner, which permits the wet concrete to flow around a complex shape such that when the concrete hardens a portion of the plastic anchor is trapped in the set concrete to form a secure attachment. It will be appreciated that the liner 160 is molded as a tube (with a center line shown as 184) which tube shape will have some natural hoop strength. Thus, depending upon the diameter of the tube and the thickness of the plastic liner 160, the anchors elements 178 described above may not be necessary in all cases. However, to ensure a good connection some form of anchoring is generally preferred.

It can now be appreciated that a plurality of composite concrete elements can be assembled together easily in the field into a complex plastic lined sewer system. The connection details allow one composite concrete element to be inserted and assembled to an adjacent composite concrete element by simple positioning of the composite concrete elements. Provided any foreign matter such as dirt or debris is cleaned off the connection details before one composite concrete element is thrust into another, the plastic liner portion will provide a corrosion resistant liner for the throughbore, which liner extends well into the joint. Further the plastic liner portion, comprising a relatively low friction surface compared to bare concrete will facilitate the slipping of one composite concrete element into the other. The plastic can act as a form of low friction lubrication to facilitate the easy assembly of the composite concrete elements.

When a corrosion resistant sealing gasket is used to seal the joint, the corrosive elements will be contained within the throughbore of the sewer system and will not be able to penetrate the joint to come into contact with any bare or exposed concrete. In this manner, the sewer system is protected from rapid degradation of the concrete due to the corrosion process outlined above. In certain cases, and in certain configurations the joint may be tight enough to prevent corrosive materials from penetrating through the joint even in the absence of a corrosion resistant gasket. For example, depending upon molding tolerances a more extreme taper may provide a form of interference fit between the abutting liner portions which interference can be accommodated by a deformation of the plastic liner to form a sealed joint. Whereas a concrete to concrete joint cannot accommodate an interference fit, a plastic liner to plastic liner joint may be able to, through plastic deformation. Thus, the present invention comprehends joints both with and without gaskets, provided that the joint resists the penetration of corrosive elements therethrough.

It can now be understood that the present invention provides a continuous corrosion resistant liner for the inside surfaces of a sewer system. The present invention takes advantage of a relatively inexpensive plastic material which can be molded into a relatively thin liner for a reasonable cost. In this manner the present invention avoids the use of expensive polymer concrete. The present invention further provides for a composite element which can be premanufactured and molded in a single molding step, in easily controlled factory conditions. The present invention is therefore suited for manufacturing in volume, which also helps reduce the costs per unit.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art, including different sizes and shapes of the composite concrete elements as described above. Those of ordinary skill in the art having access to the teachings herein will recognize these additional variations, implementations, modifications, alterations and embodiments, all of which are within the scope of the present invention, which invention is limited only by the appended claims.

What is believed to be important is to provide a relatively inexpensive liner on individual premanufactured elements configured in a way to provide sealed joints between attached elements to prevent exposed concrete of the sewer system from coming into contact with sewer or wastewater materials which can cause a chemical degradation of the concrete.

The embodiments of the invention in which an exclusive property or privilege is claimed are defined as follows:

1. A prefabricated composite concrete element for use in a corrosive sewer environment, said concrete element comprising:
    a hollow reinforced cast concrete portion with at least one end having connection details; and
    a premolded corrosion resistant inner plastic liner;
    wherein said plastic liner lines an interior of said hollow concrete element and said connection details to provide adjacent and annular liner faces in an assembled joint to limit exposure through said joint of said concrete portion to corrosive materials arising in said sewer environment;
    the liner portion including a first top step and a top face, wherein the top step and the top face cover a top end of the concrete portion and the first top step covers a top notch of the concrete portion;
    the liner portion including a side wall which fully covers an inside face of the concrete portion;
    the liner portion including a second lower step to cover a bottom notch of the concrete portion; and
    the liner portion covering all surfaces of the concrete portion except for an outer face and an open bottom face adjacent to the bottom notch, wherein the liner portion is formed as a single continuous part.

2. The prefabricated composite concrete element as claimed in claim 1, wherein said connection detail includes a notch formed in an end of said concrete portion and said liner extends at least partly into said notch.

3. The prefabricated composite concrete element of claim 1, wherein said connection details are formed on both ends of said concrete portion.

4. The prefabricated composite concrete element of claim 3, wherein said connection details include an outer notch formed at one end of said concrete portion and an inner notch formed at the other end of said concrete portion, wherein at least part of each notch is covered by said liner.

5. The prefabricated composite concrete element of claim 4, wherein said inner notch defines a lined end shoulder, wherein said lined end shoulder is sized and shaped to fit into an adjacent and annular lined outer notch of an adjacent element.

6. The prefabricated composite concrete element of claim 1, further comprising a corrosion proof gasket which is restrained from movement on an outer face of the composite concrete element.

7. The prefabricated composite concrete element of claim 6, wherein the gasket is a captive gasket.

8. The prefabricated composite concrete element of claim 6, wherein the gasket is restrained from movement by a shoulder.

9. The prefabricated composite concrete element of claim 1, wherein the connection details include a taper with a narrower diameter at a top and a larger diameter at a bottom.

10. A concrete sewer system comprising at least two prefabricated composite concrete elements assembled end to end at a joint, each of said at least two prefabricated composite concrete elements comprising:
    an outer reinforced cast concrete portion;
    at least one connection detail at one or both ends of said composite concrete element; and
    a continuous inner plastic liner defining a corrosion resistant throughbore for transporting wastewater;
    wherein each said continuous plastic liner lines an interior of said outer reinforced cast concrete portion and conforms to said connection details to permit said assembled concrete elements to form an annular liner to liner contact face in said joint; and
    wherein said liner to liner contact face permits said joint to be sealed to contain corrosive elements within said throughbore;
    each continuous plastic liner including a first top step and a top face, wherein the top step and the top face cover a top end of the concrete portion and the first top step covers a top notch of the concrete portion;
    each continuous plastic liner including a side wall which fully covers an inside face of the concrete portion;
    each continuous plastic liner including a second lower step to cover a bottom notch of the concrete portion; and
    each continuous plastic liner covering all surfaces of the concrete portion except for an outer face and an open bottom face adjacent to the bottom notch, wherein the liner portion is formed as a single continuous part.

11. The concrete sewer system of claim 10, wherein said joint is sealed with a corrosion proof gasket which is positioned between the respective liners of the assembled concrete elements at said liner to liner contact face; and
    wherein said gasket is restrained from movement.

12. The concrete sewer system of claim 11, wherein the gasket is restrained from movement by a shoulder.

13. The concrete sewer system of claim 10, wherein the connection details include a taper with a narrower diameter at a top and a larger diameter at a bottom.

14. A method of prefabricating a composite concrete element for a wastewater system, said method comprising the steps of:
    positioning an outer mold element to define an outer concrete surface of said composite concrete element;
    positioning a preformed inner plastic liner to define an interior surface of said composite concrete element, said preformed inner plastic liner at least partially further defining end connection details of said composite concrete element, and creating a casting void between said outer mold element and said preformed inner plastic liner;
    providing at least one inner mold element to support said preformed inner plastic liner in position during concrete casting;
    filling said casting void with concrete and allowing said concrete to set to form a cast composite concrete element;
    removing said at least one inner mold element, and then removing said cast composite concrete element from said outer mold element; and
    curing said cast composite concrete element to form said cured composite concrete element;
    the inner plastic liner including a first top step and a top face, wherein the top step and the top face cover a top end of a concrete portion of the composite concrete element, and the first top step covers a top notch of the concrete portion;
    the inner plastic liner including a side wall which fully covers the inside face of the concrete portion;
    the inner plastic liner including a second lower step to cover a bottom notch of the concrete portion; and
    the inner plastic liner covering all surfaces of the concrete portion except for an outer face and an open bottom face adjacent to the bottom notch, wherein the inner plastic liner is formed as a single continuous part.

15. The method of prefabricating a composite concrete element as claimed in claim 14, further including the steps of providing concrete injection ports in said outer mold element and injecting concrete through said injection ports to fill said casting void formed between said outer mold element and said plastic liner.

16. The method of prefabricating a composite concrete element as claimed in claim 14, further including proving molding blocks to support the preformed liner in position during casting of the concrete.

17. The method of prefabricating a composite concrete element as claimed in claim 16, further including providing a hydraulic ram to position at least one of said molding blocks to support the preformed liner during casting and to withdraw said molding block during said mold removal step.

18. The method of prefabricating a composite concrete element of claim 14, further comprising placing a corrosion proof gasket which is restrained from movement on an outer face of the composite concrete element.

19. The method of prefabricating a composite concrete element of claim 18, wherein the gasket is restrained from movement by a shoulder.

20. The method of prefabricating a composite concrete element of claim 14, wherein the inner plastic liner includes a taper with a narrower diameter at a top and a larger diameter at a bottom.

\* \* \* \* \*